UNITED STATES PATENT OFFICE.

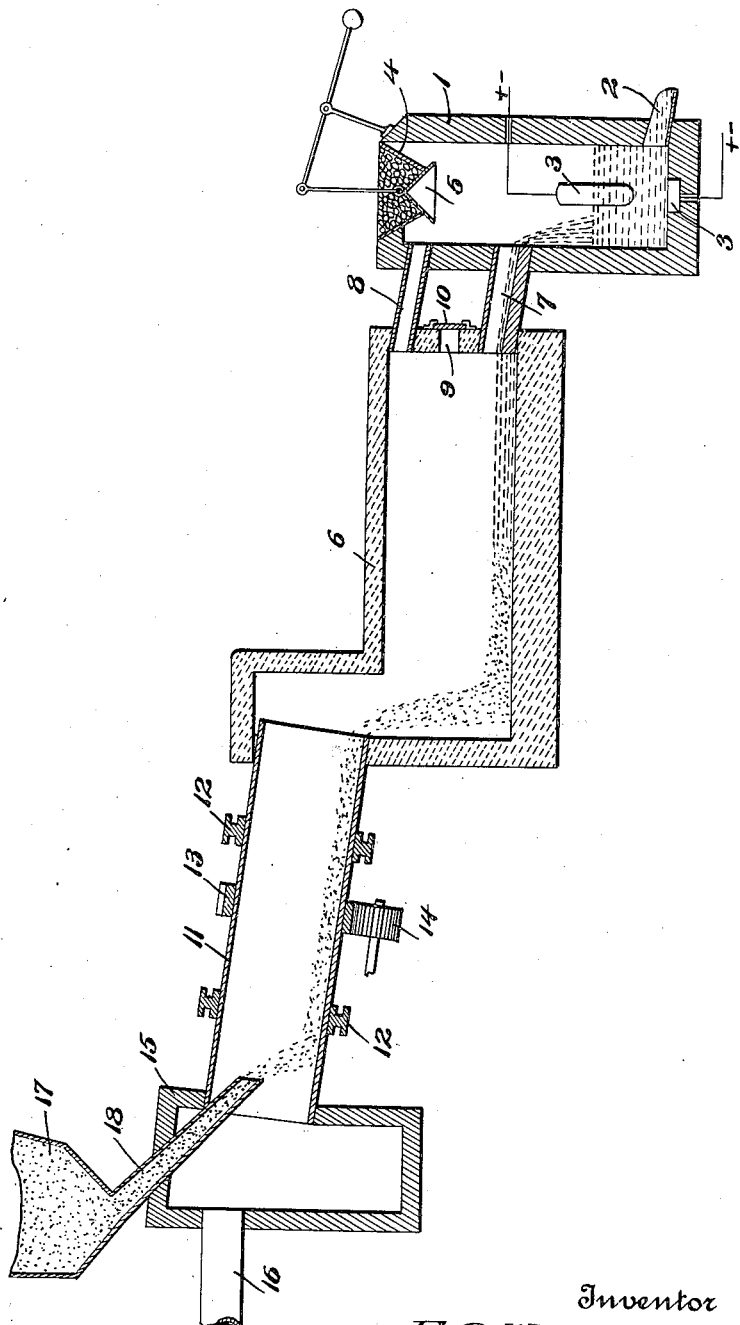

FRANK S. WASHBURN, OF RYE, NEW YORK, ASSIGNOR TO AMERICAN CYANAMID COMPANY, OF NEW YORK, N. Y., A CORPORATION OF MAINE.

PROCESS OF AND APPARATUS FOR PRODUCING PHOSPHORIC ACID AND COMPOUNDS OF THE SAME.

1,359,211.  Specification of Letters Patent.  Patented Nov. 16, 1920.

Application filed April 21, 1919. Serial No. 291,528.

*To all whom it may concern:*

Be it known that I, FRANK S. WASHBURN, a citizen of the United States, residing at Rye, in the county of Westchester and State of New York, have invented certain new and useful Improvements in Processes of and Apparatus for Producing Phosphoric Acid and Compounds of the Same; and I do hereby declare the following to be a full, clear, and exact description of the invention, such as will enable others skilled in the art to which it appertains to make and use the same.

This invention relates to a process of and apparatus for making phosphoric acid and compounds of the same and has for one of its objects to improve certain of the prior processes and apparatus heretofore proposed.

With this and other objects in view the invention consists in the novel steps and combinations of steps constituting the process, and in the novel combinations of parts constituting the apparatus all as will be more fully hereinafter disclosed and particularly pointed out in the claims.

In order that the precise nature of my present invention may be the more clearly understood it is said:—In my prior U. S. Patent #1047864, granted December 17, 1912, and entitled Process of producing phosphorus from mineral phosphates, I have disclosed a method of obtaining phosphorus and its compounds from tri-calcium phosphate in the form of phosphate rock by fusing the said rock together with a flux of silicious material in an electric furnace. As pointed out in the said patent, however, not all of the phosphorus could be liberated from the rock in this manner, even when working the charge in the electric furnace, and in order to remedy this the said patent goes on to disclose the addition of a carbonaceous material in order to effect the complete removal of the phosphorus.

The addition of the necessary amount of carbon influences the reaction between the phosphate rock and silica, resulting in the consumption of additional energy to complete the said reaction, and where electricity is utilized to carry out the process, as above indicated, this additional consumption of energy is found to constitute an appreciable item.

In order to reduce the amount of electrical energy required as far as possible, I have found it advantageous to preheat the raw material before charging it into the electric furnace and I have disclosed one method of such preheating in my prior U. S. Patent #1100639, granted June 14, 1914, and entitled Process and apparatus for making phosphoric acid and compounds of the same. In the method disclosed in this said patent, I have performed the preheating of the charge, as well as the melting of the same in a blast furnace, by the burning of a comparatively cheap fuel such as coke, charcoal, etc., directly in the charge of rock and silica, which was then tapped into an electric furnace where the reaction was completed.

I have found, however, that by suitably utilizing the gaseous products coming from the electric furnace, it is in many cases unnecessary to add any extraneous fuel whatever, or at most, only a very small amount, substantially negligible in quantity and cost, and I therefore propose in the present invention to actually melt down the charge of raw material by the efficient use of these said gaseous products before running it into the electric furnace. I thereby avoid any waste of heat, and utilize the same for the conservation of the electrical energy, with a consequent material reduction in the cost of operation and increase in efficiency.

Referring to the accompanying drawing forming a part of this specification, in which the figure is a diagrammatic sectional view of an apparatus made in accordance with this invention, and suitable for carrying out the process forming a part thereof, 1 indicates an electric furnace, having a suitable tap hole 2, and provided with one or more electrodes 3, and a suitable charging hopper 4, controlled by the bell 5. 6 represents a hearth furnace connected at one end to the electric furnace 1 by means of the slag spout 7 and flue 8, substantially as shown. The said hearth furnace is further provided at this end with an air inlet 9, adapted to be controlled in any suitable manner, as by the gate or slide 10.

A rotary kiln 11 is mounted so as to discharge into the other end of the said hearth furnace 6, and is provided with suitable supports 12, as well as with means such as the gears 13 and 14, for rotating the same. 15 represents a dust chamber, provided with a gas flue 16, and 17 designates a bin or receptacle for holding the raw material, which is fed into the kiln 9 as by the chute 18.

In carrying out the present process, the electric furnace 1 is first charged with a suitable mixture of phosphate rock and silica, in say substantially the proportions given in my said prior Patent #1100639, and the necessary amount of carbon is fed down from the charging hopper 4. The current is now turned on and the charge in the furnace 1 is fused with consequent evolution of a varying percentage of phosphorus, phosphoric acid vapors and carbon monoxid.

Raw material consisting of phosphate rock and silica in suitable proportions as above indicated is now fed from the bin 17 through the chute 18 into the rotary kiln 11 and passes therefrom into the hearth furnace 6. The gaseous products from the reaction in the furnace 1 pass therefrom through the flue 8 into the furnace 6 and air being admitted through the inlet 9, the said gases burn in the said furnace 6, generating sufficient heat to fuse the raw material therein.

The products of this combustion in the furnace 6 pass therefrom into the rotary kiln 11, where they lose their heat to the cold raw material coming in from the chute 18, and finally pass through the flue 16 to any suitable absorption or collecting apparatus, not shown. The fusion of the raw material in the furnace 6, of course, liberates a portion of the combined phosphorus, but the temperature and quantity of heat obtainable therein is not high enough for the greatest efficiency, which can only be obtained in an electric furnace. Furthermore, it must be remembered that there is no carbonaceous material present in the said furnace 6, which as above pointed out, would greatly assist in the reaction. The fused material is therefore run through the slag spout 7 into the electric furnace 1, where carbonaceous material is fed in suitable quantities from the hopper 4, where the most efficient temperature for carrying on the reaction may be readily maintained.

From what has just been disclosed it will be evident that after the operation is once started the raw material coming from the bin 17 will be first preheated by coming in contact with the hot products of combustion, in the rotary kiln 11; it will then pass into the hearth furnace 6 where it will be melted by the burning carbon monoxid and phosphorus vapors there giving up a portion of its contained phosphorus; and that the melted charge will finally pass to the electric furnace 1, where it will have added to it the required amount of carbonaceous material and be subjected to the efficient relatively high temperatures of this said furnace, which will liberate substantially all of the remaining phosphorus.

As pointed out in my said prior Patent #1100639, phosphate rock is of extremely variable composition, and in view of this it is difficult to state any definite proportions for the charge. However, a charge which will produce a slag containing say from 30 to 45 parts of silica and from 50 to 65 parts of lime has been found to present no difficulties to the efficient operation of the process.

I have found that by this system of heating the charge, I can substantially double my output of $P_2O_5$ per unit of electric energy over the former practice of dumping the cold charge directly into the electric furnace, and if the charge is dry, without the use of any extraneous fuel. If, however, the charge is very wet, it may be necessary to burn a very small amount of oil or coal in the rotary kiln to assist in evaporating the water and preheating the charge to the temperature necessary for feeding into the hearth furnace 6. By suitably arranging the elevation of hearth furnace 6 with respect to electric furnace 1, the control of the hearth furnace may be made entirely by the tapping of the electric furnace. Also the hearth furnace will take care of a part of the reactions in that in the melted charge therein some phosphoric anhydrid is evolved by direct replacement of silica.

It is self evident that in this system of operation it would not be advisable to charge the carbon necessary for reduction purposes and utilized only in the electric furnace, through the kiln or the hearth furnace. The atmosphere in the kiln and hearth furnace is strongly oxidizing and would burn the carbonaceous material before it reached the point of reaction and this carbonaceous material is, therefore, charged through the charging device 4 of the electric furnace.

It is obvious that if desired the flue 8 and slag spout 7 may be combined into one single flue without changing the principle of my operation.

I am aware that attempts have been made to carry out this same principle of operation by burning the combustion gases coming off the electric furnace in a rotary kiln through which the furnace charge was passed, but in view of the extremely high calorific power and calorific intensity, this use of the rotary kiln has not been successful. The fusible character of the charge causes sticking to the kiln walls, and when a temperature near this melting point is attained, there is a consequent blocking of the kiln. To divert only part of the gases to the kiln and so limit the temperature, is to defeat the object of heat conservation, as the other portion of the said gases not sent to the kiln must be burned and cooled down before passing to the absorption towers for recovery of the valuable constituents contained therein, and its calorific power would thus be lost.

It is obvious that those skilled in the art may vary the steps constituting the process, as well as the arrangement of parts constituting the apparatus, without departing from the spirit of the invention, and therefore, I do not wish to be limited to the above disclosure except as may be required by the claims.

What I claim is:—

1. The process of making phosphoric acid and compounds of the same which consists in preheating in a rotary furnace a mixture of phosphate rock and silicious material; subjecting said preheated material in a hearth furnace to a temperature sufficient to fuse the same and to liberate a portion of the contained phosphorus; subjecting the said fused material to a further heating at a temperature sufficient to liberate substantially all of the remaining phosphorus; and utilizing the gaseous products of the last mentioned reaction to fuse and preheat fresh charges of raw material, and recovering the liberated phosphorus substantially as described.

2. The process of making phosphoric acid and compounds of the same which consists in preheating in a rotary furnace a mixture of phosphate rock and silicious material; subjecting said preheated material in a hearth furnace to a temperature sufficient to fuse the same and to liberate a portion of the contained phosphorus; adding a carbonaceous material to said fused material; subjecting said fused and carbonaceous materials to a further heating and to a temperature sufficient to liberate substantially all of the remaining phosphorus; utilizing the gaseous products of the last mentioned reaction to fuse and preheat fresh charges of raw material; and suitably recovering the phosphoric acid vapors evolved, substantially as described.

3. The process of making phosphoric acid and compounds of the same which consists in subjecting a mixture of phosphate rock and silicious material and a carbonaceous material in an electric furnace to a temperature sufficient to liberate substantially all of the contained phosphorus; burning the gaseous products of the reaction in a hearth furnace to fuse a fresh charge of rock and silicious material; passing the incoming charge of rock and silicious material through the products of the combustion whereby the said charge is preheated; and suitably recovering the phosphoric acid vapors evolved, substantially as described.

4. The process of making phosphoric acid and compounds of the same which consists in providing a fused mixture of phosphate rock and a silicious material; adding a carbonaceous material thereto; subjecting the said mixture in an electric furnace to a temperature sufficient to liberate substantially all of the contained phosphorus; burning the gaseous products of the reaction in the presence of a fresh charge of rock and silicious material in a hearth furnace to fuse the same; bringing the incoming charge into contact with the products of the combustion in a rotary kiln to preheat the same; and recovering the phosphorus and phosphoric acid vapors evolved, substantially as described.

5. The process of making phosphoric acid from phosphate rock, which consists in subjecting a mixture of said rock and a silicious material to the preheating temperature of a fuel fed rotary furnace; subjecting the charge thus preheated to the melting temperature of fuel fed hearth furnace; subjecting the charge thus melted to the liquefying temperature of an electric furnace in the presence of carbon; conducting the evolved gases including the evolved phosphorus back over new charge material; feeding air to and igniting the said gases to preheat and melt said new material; and recovering the combined phosphorus thus produced, substantially as described.

6. In an apparatus for producing phosphoric acid and compounds of the same the combination of a preheating rotary chamber adapted to receive a charge of phosphate rock and silicious material; a fuel fed fusion chamber associated with said preheating chamber and adapted to receive the discharge therefrom; an electric furnace adapted to receive the discharge from said fusion chamber; means in said furnace adapted to raise the temperature therein to a point sufficiently high to liberate substantially all of the contained phosphorus; means for feeding carbon to said electric furnace and means for returning the gaseous products of the reaction to said fusion and preheating chambers, substantially as described.

7. In an apparatus for producing phosphoric acid and compounds of the same, the combination of a rotary kiln; means for continuously feeding a mixture of phosphate rock and a silicious material to said kiln; a hearth furnace adapted to receive the discharge from said kiln; an electric furnace; connections between said hearth and electric furnaces whereby gases generated in the latter may be transferred to the former; means for admitting air to said hearth furnace, whereby said gases may be burned therein to fuse said mixture and liberate a portion of its phosphorus; means for transferring said fused mixture to said electric furnace; means for adding a carbonaceous material to said fused mixture while in said electric furnace; and means for raising the temperature in said electric furnace to a point higher than that attainable in said hearth furnace, whereby substantially all of the remaining phosphorus may be liberated from said mixture, substantially as described.

In testimony whereof I affix my signature, in presence of two witnesses.

FRANK S. WASHBURN.

Witnesses:
 M. G. LOGAN,
 H. G. NOLAN.